United States Patent
Bakke et al.

(10) Patent No.: US 9,594,710 B2
(45) Date of Patent: *Mar. 14, 2017

(54) IMPLEMENTING EXTENT GRANULARITY AUTHORIZATION COMMAND FLOW PROCESSING IN CAPI ADAPTERS

(71) Applicant: International Business Machines Corporation, Armonk, NY (US)

(72) Inventors: Brian E. Bakke, Rochester, MN (US); Adrian C. Gerhard, Rochester, MN (US); Daniel F. Moertl, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/628,964

(22) Filed: Feb. 23, 2015

(65) Prior Publication Data

US 2016/0148008 A1  May 26, 2016

Related U.S. Application Data

(63) Continuation of application No. 14/548,427, filed on Nov. 20, 2014.

(51) Int. Cl.
*G06F 21/00* (2013.01)
*G06F 13/38* (2006.01)
(Continued)

(52) U.S. Cl.
CPC ........ *G06F 13/382* (2013.01); *G06F 9/45558* (2013.01); *G06F 21/53* (2013.01);
(Continued)

(58) Field of Classification Search
CPC .... G06F 13/382; G06F 9/45558; G06F 21/53; G06F 21/6218; G06F 2009/45579; G06F 2221/2141
See application file for complete search history.

(56) References Cited

U.S. PATENT DOCUMENTS 6,065,041 A  5/2000 Lum et al.
7,805,706 B1  9/2010 Ly et al.
(Continued)

FOREIGN PATENT DOCUMENTS

JP  09237246 A  9/1997

OTHER PUBLICATIONS

Appendix P—List of IBM Patents or Patent Applications Treated As Related—May 16, 2015.
(Continued)

*Primary Examiner* — Carl Colin
*Assistant Examiner* — Ghodrat Jamshidi
(74) *Attorney, Agent, or Firm* — Joan Pennington

(57) ABSTRACT

A method, system and computer program product are provided for implementing block extent granularity authorization command flow processing for a Coherent Accelerator Processor Interface (CAPI) adapter. An Application Client builds a command including start LBA and number of LBAs and Child Authorization Handle. The Application Client sends the command directly to the CAPI Adapter via the Application Clients CAPI Server Registers assigned to the specific Application Client. The CAPI adapter validate that the requesting Client is authorized to perform the command using the Authorization Handle and the receiving CAPI Server Register address. The CAPI Adapter executes the validated command and sends completion back to the Application Client.

10 Claims, 21 Drawing Sheets

(51) Int. Cl.
*G06F 21/53* (2013.01)
*G06F 21/62* (2013.01)
*G06F 9/455* (2006.01)

(52) U.S. Cl.
CPC .................. *G06F 21/6218* (2013.01); *G06F 2009/45579* (2013.01); *G06F 2221/2141* (2013.01)

(56) References Cited

U.S. PATENT DOCUMENTS

| | | | |
|---|---|---|---|
| 7,930,487 B1 | 4/2011 | Faibish et al. | |
| 8,041,875 B1 | 10/2011 | Shah et al. | |
| 8,146,084 B1 | 3/2012 | Meketa | |
| 2004/0025166 A1* | 2/2004 | Adlung | G06F 21/606 719/310 |
| 2005/0097271 A1 | 5/2005 | Davies et al. | |
| 2006/0195663 A1 | 8/2006 | Arndt et al. | |
| 2009/0198618 A1 | 8/2009 | Chan et al. | |
| 2011/0072234 A1 | 3/2011 | Chinya et al. | |
| 2011/0179414 A1 | 7/2011 | Goggin et al. | |
| 2011/0320759 A1 | 12/2011 | Craddock et al. | |
| 2012/0159245 A1 | 6/2012 | Brownlow et al. | |
| 2012/0254587 A1 | 10/2012 | Biran et al. | |
| 2013/0073821 A1 | 3/2013 | Flynn et al. | |
| 2013/0198262 A1 | 8/2013 | Troel | |
| 2013/0298138 A1 | 11/2013 | Avadhanam | |
| 2013/0318084 A1 | 11/2013 | Dalal | |
| 2015/0205730 A1 | 7/2015 | Dell et al. | |

OTHER PUBLICATIONS

Berry, "Power8 & IBM i Overview", pp. 1-47, Jun. 17, 2014.
Wile, Bruce, "Coherent Accelerator Processor Interface (CAPI) for Power8 Systems", White Paper, International Business Machines Corporation, Sep. 29, 2014 (http://www-304.ibm.com/webapp/set2/sas/f/capi/CAPI_POWER8.pdf).
International Search Report and Written Opinion of the ISA dated Feb. 16, 2016—International Application No. PCT/IB2015/058743.
Stuecheli, POWER8 International Business Machines Corporation, Aug. 2013.

* cited by examiner

AUTHORIZATION ENTRY 140

| CAPI CLIENT/USER ID 150 | CAPI SERVER REGISTER SPACE 152 (RESOURCE AND EXTENTS INFO) | CAPI SET OF ALLOWED FUNCTIONS 154 (ACCESS TYPES) |
|---|---|---|

FIG. 1C

IMPLEMENTING EXTENT GRANULARITY AUTHORIZATION COMMAND FLOW PROCESSING IN CAPI ADAPTERS

This application is a continuation application of Ser. No. 14/548,427 filed Nov. 20, 2014.

FIELD OF THE INVENTION

The present invention relates generally to the data processing field, and more particularly, relates to a method, computer system and computer program product for implementing block extent granularity authorization command flow processing in Coherent Accelerator Processor Interface (CAPI) adapters.

DESCRIPTION OF THE RELATED ART

Persistent secondary storage is a component of virtually all computer systems. This storage is usually a block device such as a hard disk drive or flash storage device. Storage adapters often are used to connect a host computer system to peripheral storage I/O devices such as hard disk drives, solid state drives, tape drives, compact disk drives, and the like.

In a traditional computer system an application that needs to read or write data to the block device makes an Operating System (OS) and/or File System (FS) call to read or write the requested blocks of data. The Operating System or File System is a Trusted part of the computer system and as part of a Read/Write request will verify or authenticate that the application is allowed to access the requested blocks of data. If the authentication is successful, the OS will build a command for the Read/Write request and send the command to the Host Bus Adapter (HBA) to service. Since the HBA can only receive commands from the OS, the HBA knows that the requested range of Blocks has been authenticated and is safe to execute the command.

IBM has introduced a new Block Device I/O model as part of the OpenPOWER Foundation. This new Block Device I/O model uses Coherent Accelerator Processor Interface (CAPI) technology. CAPI allows an application to build a Read/Write command for an input/output adapter (IOA) and send it directly to the IOA, bypassing the OS/FS and as such also bypasses the traditional authentication. Without authentication, an application can get to data that it should not be allowed to access. For example, in a server system that contains proprietary data for a first competitor and a second competitor, the lack of authentication would allow the first competitor to access second competitor's data.

Current techniques for block device authorization outside of an OS/FS use out-of-band techniques such as zoning having a granularity level of the block device or Logical Unit (LUN).

A need exists for an effective mechanism to implement block extent granularity authorization command flow processing for a Coherent Accelerator Processor Interface (CAPI) adapter in a computer system. It is desirable that such mechanism enables effective and efficient utilization of the CAPI adapter, bypassing many host CPU requirements for performing IO operations.

SUMMARY OF THE INVENTION

Principal aspects of the present invention are to provide a method, system and computer program product for implementing block extent granularity authorization command flow processing for a Coherent Accelerator Processor Interface (CAPI) adapter. Other important aspects of the present invention are to provide such method, system and computer program product substantially without negative effects and that overcome many of the disadvantages of prior art arrangements.

In brief, a method, system and computer program product are provided for implementing block extent granularity authorization command flow processing for a Coherent Accelerator Processor Interface (CAPI) adapter. An Application Client builds a command including start LBA and number of LBAs and Child Authorization Handle. The Application Client sends the command directly to the CAPI Adapter via the Application Clients CAPI Server Registers assigned to the specific Application Client. The CAPI adapter validate that the requesting Client is authorized to perform the command using the Authorization Handle and the receiving CAPI Server Register address. The CAPI Adapter executes the validated command and sends completion back to the Application Client.

In accordance with features of the invention, the CAPI adapter enforces access rights on each command by verifying that the Child Authorization Handle passed in the command belongs to the requesting Client and that the Client is authorized to the requested command, function, and Extent.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A and 1B, and FIG. 1C respectively illustrates an example computer for implementing Coherent Accelerator Processor Interface (CAPI) authorization in a CAPI adapter and an example CAPI authorization handle array elements in accordance with the preferred embodiments;

DETAILED DESCRIPTION OF THE
PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing block extent granularity authorization command flow processing in a CAPI adapter in accordance with the preferred embodiments.

Figure 1A:
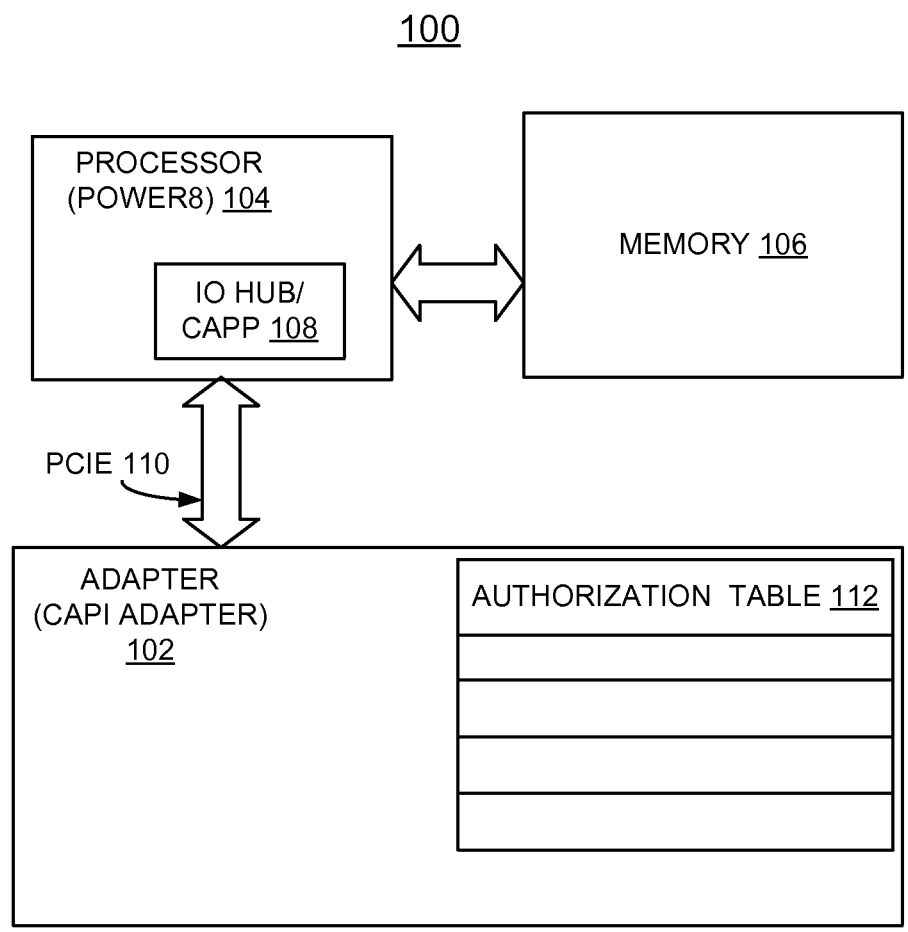
Figure 1B:
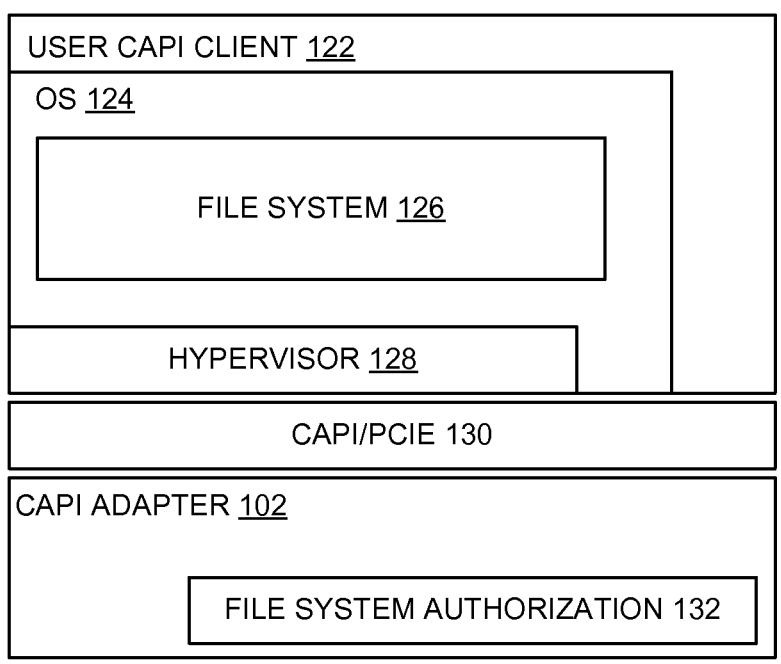

Having reference now to the drawings, in FIGS. 1A and 1B, there is shown an example computer system generally designated by the reference character 100 for implementing block extent granularity authorization command flow processing in a CAPI adapter 102 in accordance with the preferred embodiments. Computer system 100 includes one or more processors 104, or central processor units (CPUs) 104 (one shown) coupled to a system memory 106 and coupled by an I/O hub or Coherent Attach Processor Proxy (CAPP) 108 and Peripheral Component Interconnect Express (PCI-Express or PCIE) connection to the CAPI adapter 102. The CAPI adapter 102 includes an Authorization Table 112 containing multiple Authorization Entries to implement authorization in accordance with the preferred embodiments.

As shown in FIG. 1B, computer system 100 includes an example storage stack 120 including user CAPI client 122, an operating system 124 including a file system 126, a hypervisor 128 coupled by CAPI/PCIE interface block 130 to the CAPI adapter 102, which includes a file system authorization function 132 in accordance with the preferred embodiments. The CAPI/PCIE interface block 130 includes a CAPI transport mechanism that rides on top of a system transport mechanism or PCIE. The CAPI client 122 is a unique system entity that has a separately identified set of permissions to access CAPI adapter function.

Referring also to FIG. 1C, the authorization table 112 includes authorization entries 140 to implement authorization in accordance with the preferred embodiments. The illustrated example authorization entry 140 includes a CAPI Client user ID 150, a CAPI server register space 152 including resource and extents information and a CAPI set of allowed functions 154 including allowed access types in accordance with the preferred embodiments.

In accordance with features of the invention, the CAPI server register space 152 is CAPI adapter system bus address space that contains multiple copies of register(s) that can be used to start a command. Each copy is referred to as CAPI Server registers. Each CAPI Server registers have access to only the adapter Functions that the specific CAPI Server registers have previously been authorized to.

In accordance with features of the invention, a CAPI client ID is an index to a specific copy of CAPI Server registers. One or more of the CAPI Clients is identified as Master Client(s). The CAPI Server registers for the Master Client are used to perform CAPI adapter initialization functions and CAPI Server registers have access to all CAPI adapter functions.

Figure 2A:
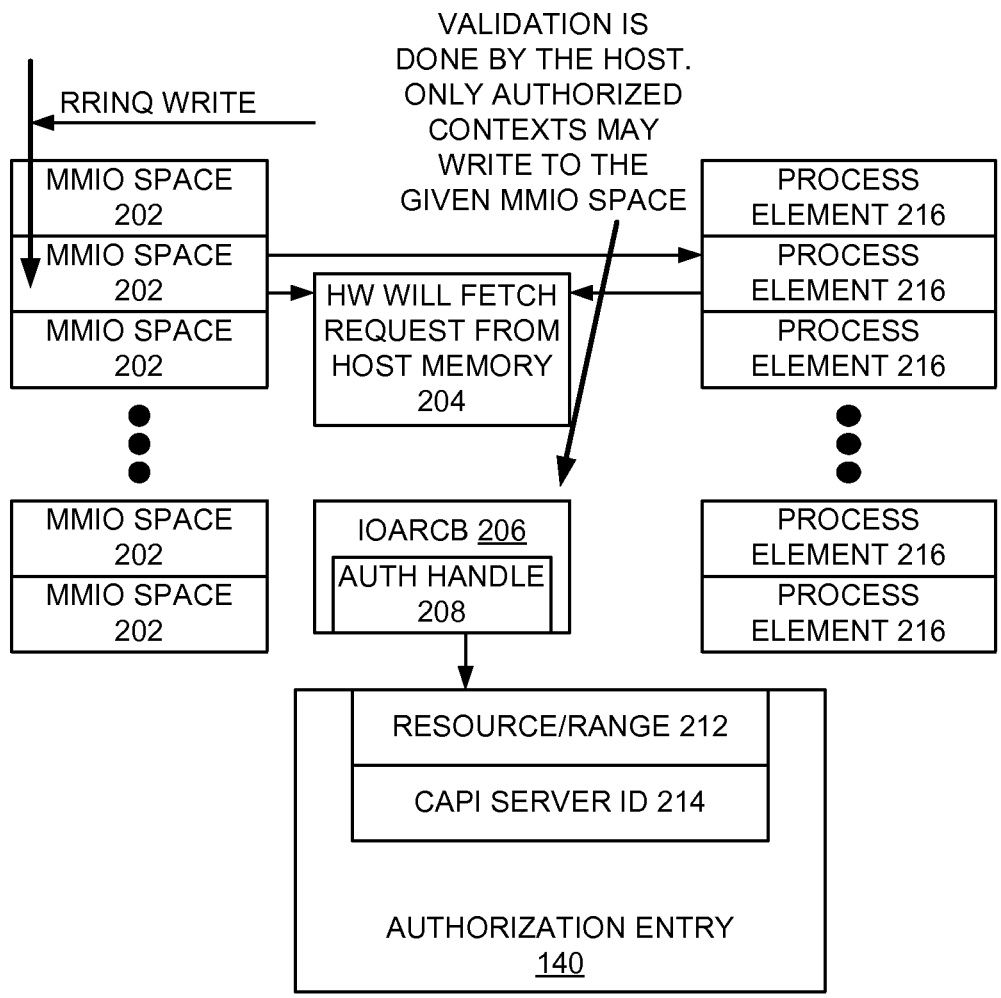
FIGS. 2A and 2B illustrates example CAPI authorization operations to validate a command in accordance with the preferred embodiments.
Figure 2B:
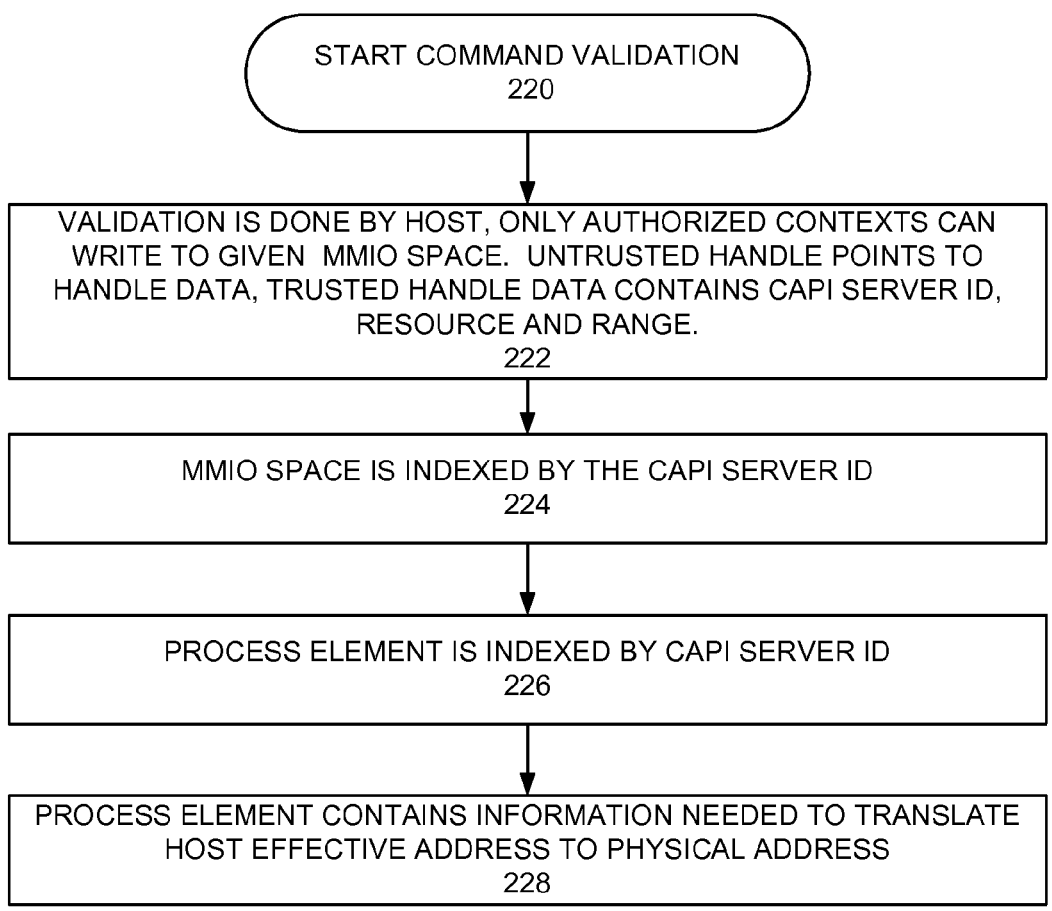

Referring now to FIGS. 2A and 2B, there are shown example CAPI authorization operations to validate a command in accordance with the preferred embodiments. In FIG. 2A, example CAPI authorization operations to validate a command are generally designated by the reference character 200. Validation is done by the host, only authorized contexts may write to the given MMIO space 202 shown in FIG. 2A and as indicated in a block 222 in FIG. 2B. In FIG. 2A, an IO Adapter Request Control Block (IOARCB) 206 contains an authorization handle 208. As indicated at block 222 in FIG. 2B and shown with authentication entry 140 in FIG. 2A, trusted handle data contains CAPI Server ID 214 and Resource and Range 212. As indicated in a block 224, MMIO Space 202 is indexed by CAPI Server ID 214. As indicated in a block 226, Process Element 216 shown in FIG. 2A, is indexed by CAPI Server ID. As indicated in a block 228, Process Element 216 contains information needed to translate host Effective Address to physical address.

Referring now to FIGS. 3A, 3B, 3C, 3D, 3E and 3F, there are shown example read command operations including CAPI authorization model and authentication process operations for a read command in accordance with the preferred embodiments.

Figure 3A:
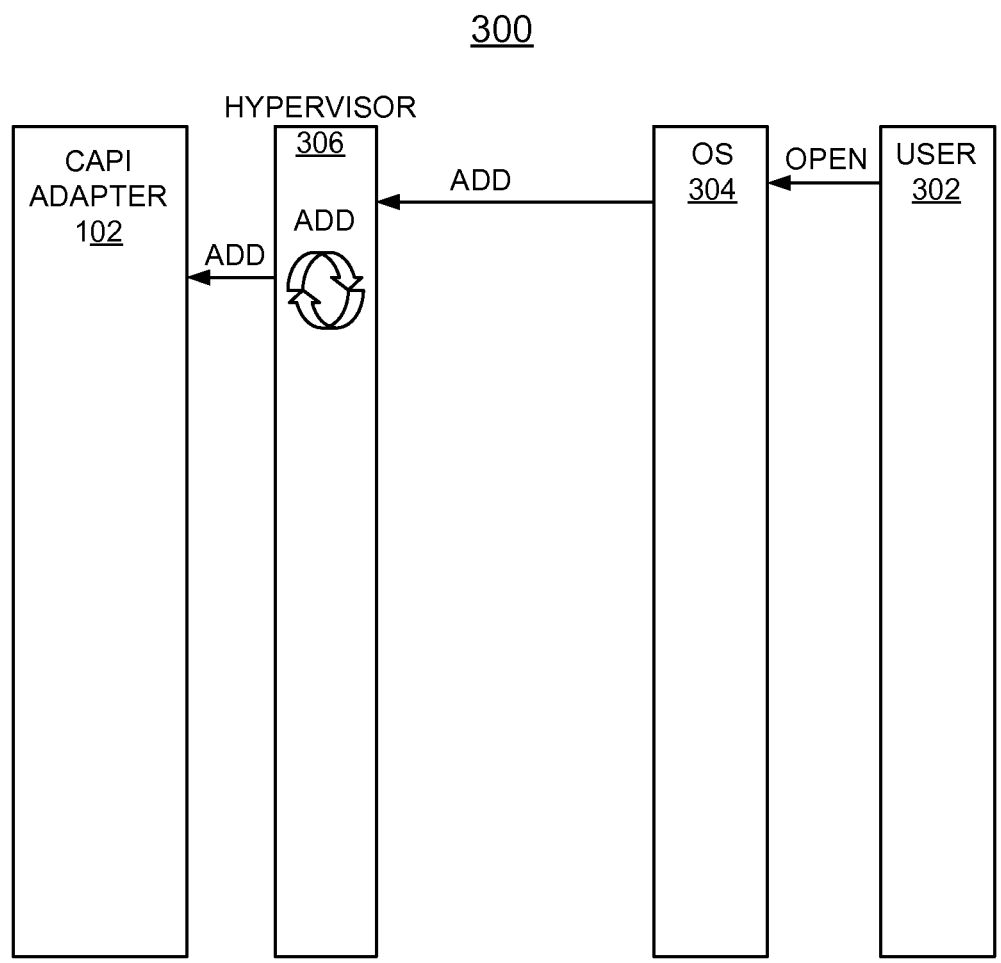
FIGS. 3A, 3B, 3C, 3D, 3E and 3F illustrates example read command with CAPI authorization model and authentication process operations in accordance with the preferred embodiments.
Figure 3B:
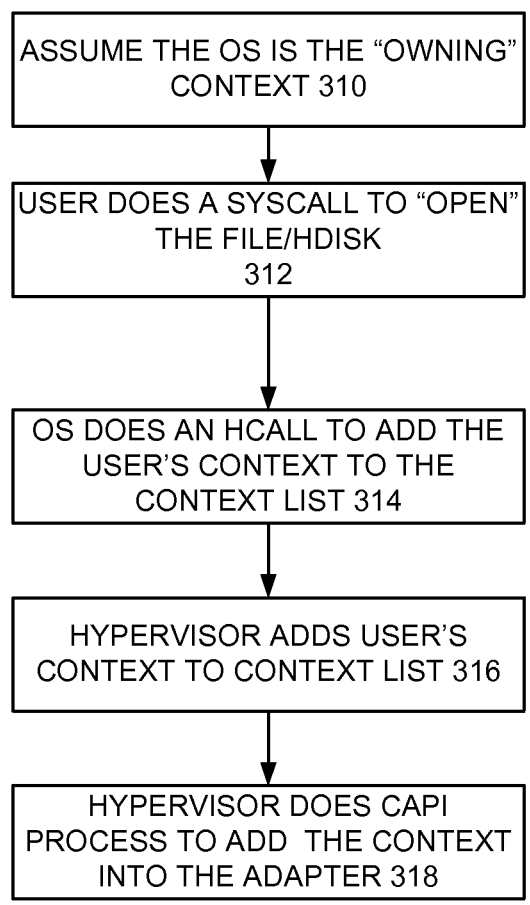

In FIG. 3A, example CAPI authorization operations for the read command are generally designated by the reference character 300. Example CAPI authorization operations 300 are shown with a user 302, OS 304, hypervisor 306, and CAPI adapter 102. Assume the OS is the "owning" context as indicated in a block 310 in FIG. 3B. As indicated in a block 312, User does a syscall to "open" the file/hdisk. OS does an hcall to add the user's context to the context list as indicated in a block 314. The hypervisor adds user's context to context list as indicated in a block 316. The hypervisor does CAPI process to add the context into the adapter as indicated in a block 318.

Figure 3C:
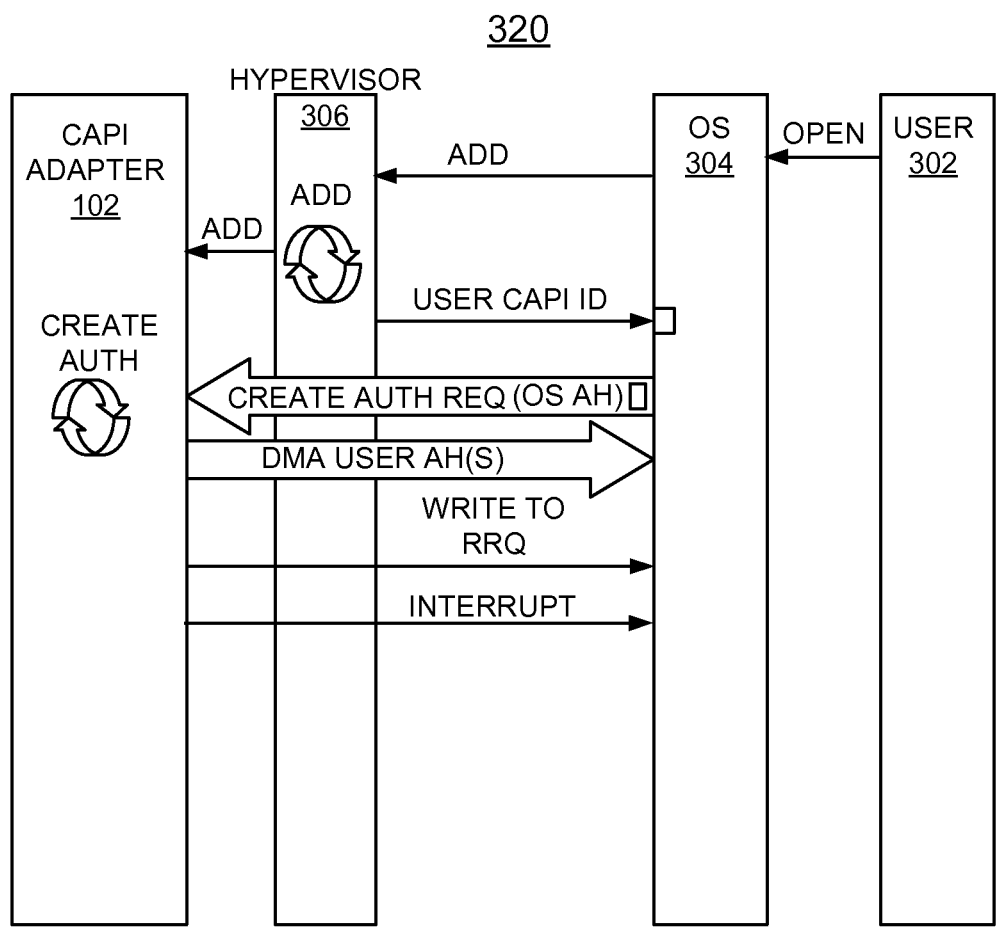
Figure 3D:
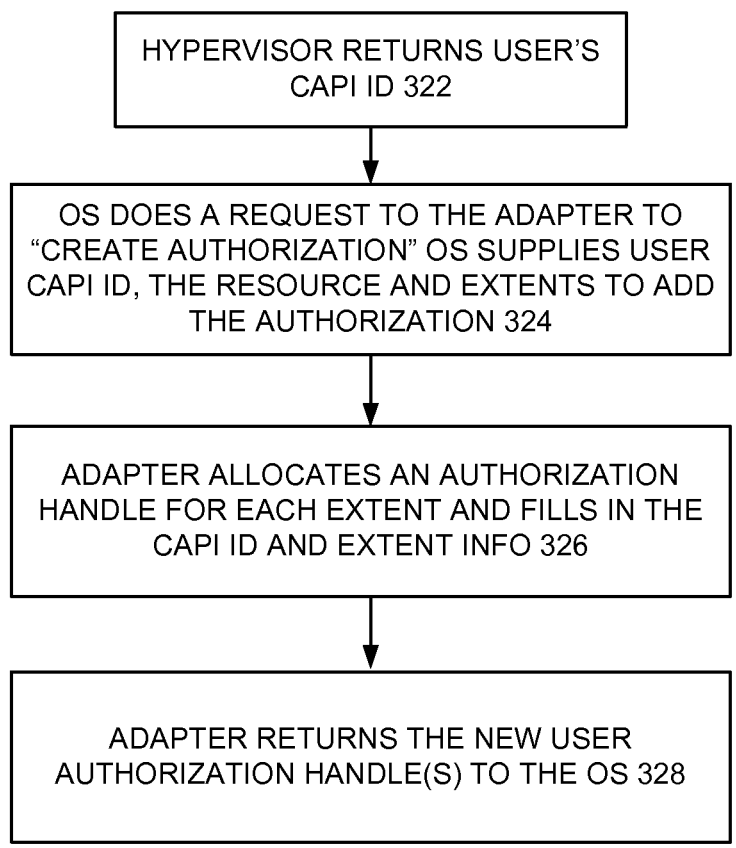

In FIG. 3C, example CAPI authorization operations for the read command are generally designated by the reference character 320. Example CAPI authorization operations 320 are shown with user 302, OS 304, hypervisor 306, and CAPI adapter 102. In FIG. 3D, as indicated in a block 322, the hypervisor returns the user's CAPI ID. The OS does a request to the adapter to "create authorization" and OS supplies User CAPI ID, and supplies resource and extents to add the authorization as indicated in a block 324. The adapter allocates an authorization handle for each extent and fills in the CAPI ID and extent information as indicated in a block 326. As indicated in a block 328, the adapter returns the new user authorization handle(s) to the operating system.

Figure 3E:
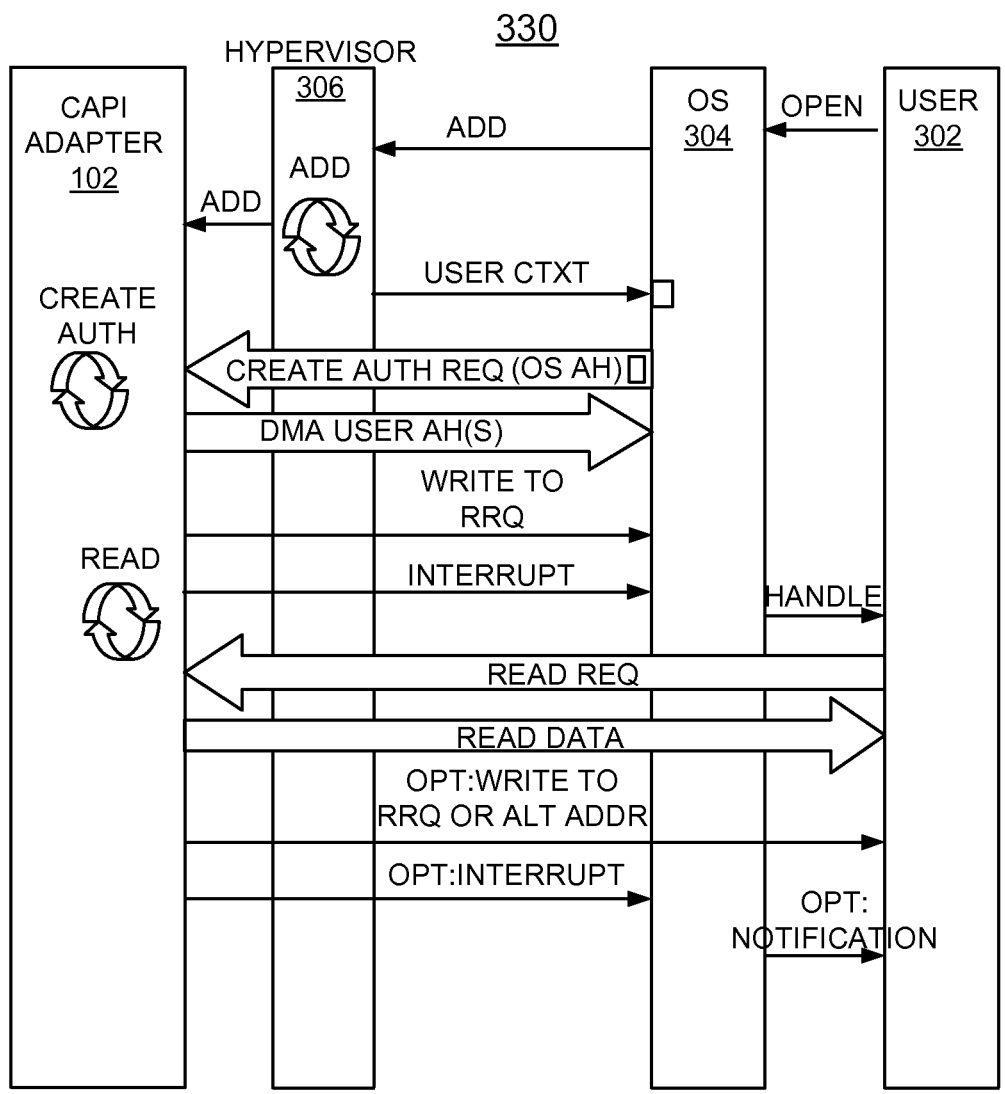
Figure 3F:
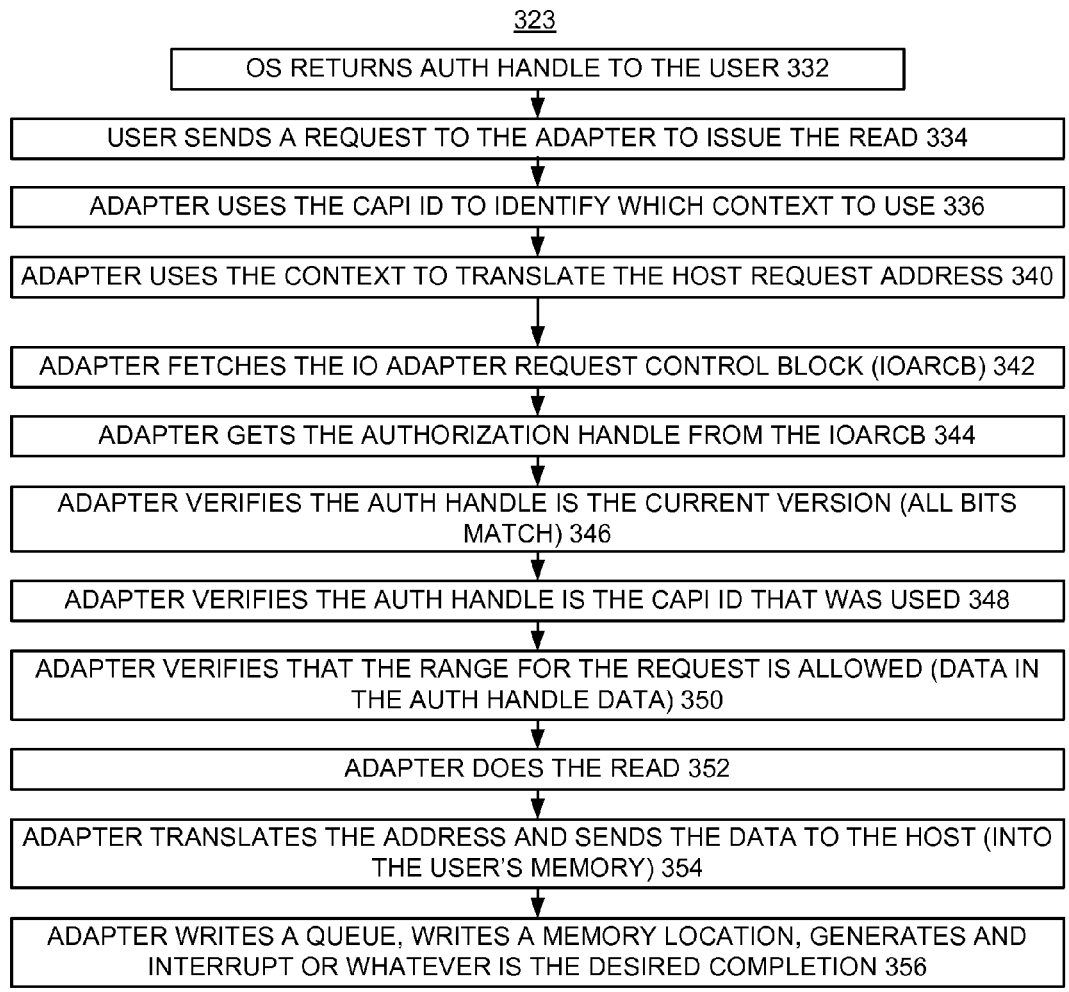

In FIG. 3E, example CAPI authorization operations for the read command are generally designated by the reference character 330. Example CAPI authorization operations 330 are shown with user 302, OS 304, hypervisor 306, and CAPI adapter 102. In FIG. 3F, as indicated in a block 332 OS returns authorization handle to the user. User sends a request to the adapter to issue the read as indicated in a block 334.

Adapter uses the CAPI ID to identify which context to use as indicated in a block 336. Adapter uses the context to translate the host request address as indicated in a block 340.

As indicated in a block 342, adapter fetches the IO Adapter Request Control Block (IOARCB). Adapter gets the authorization handle from the IOARCB as indicated in a block 344. Adapter verifies the authorization handle is the current version (all bits match) as indicated in a block 346.

As indicated in a block 348 adapter verifies the authorization handle is for the CAPI ID that was used. Adapter verifies that the range for the request is allowed (data in the authorization handle data) as indicated in a block 350. Adapter does the read as indicated in a block 352. Adapter translates the address and sends the data to the host (into the user's memory) as indicated in a block 354. Adapter writes a queue, writes a memory location, generates an interrupt or whatever the desired completion as indicated in a block 356.

Figure 4:
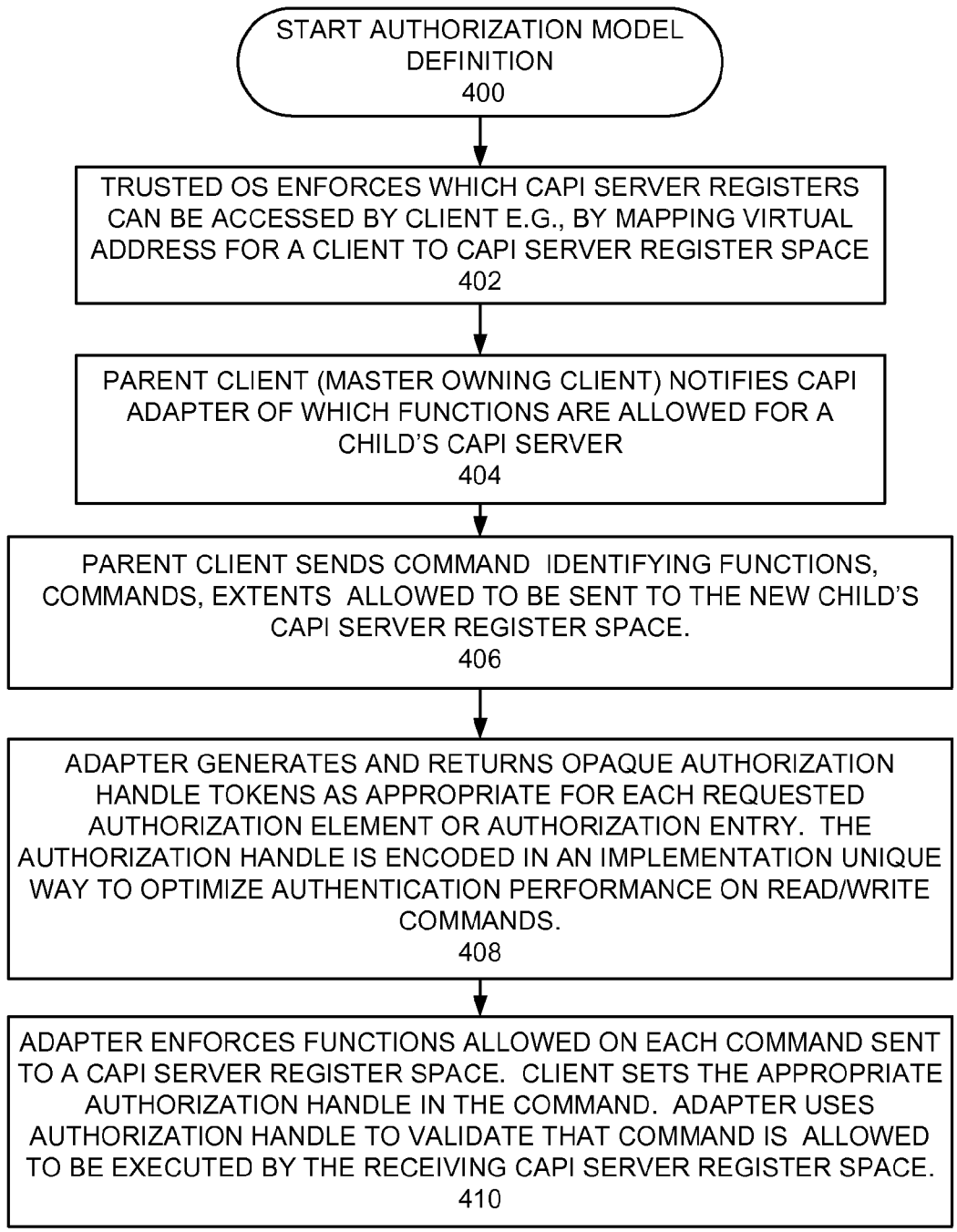
FIG. 4 illustrates example CAPI authorization model processing operations in accordance with the preferred embodiments.

In accordance with features of the invention, the CAPI authorization model is based on split enforcement of rights, as illustrated and described with respect to FIG. 4.

Referring now to FIG. 4, there are shown example CAPI authorization model operations in accordance with the preferred embodiments starting at a block 400. As indicated in a block 402, the Trusted OS enforces which CAPI Server registers can be accessed by which Clients. This is accomplished by, for example mapping a virtual address for a Client to a CAPI Server register space. As indicated in a block 404, the Parent Client (initially the Master Owning Client) notifies the CAPI adapter 102 of which functions are allowed for a Child's CAPI Server. As indicated in a block 406, the Parent Client sends a command or command(s) to its previously authorized CAPI Server register space identifying the Functions, Commands, Extents, allowed to be sent to the new Child's CAPI Server register space. As indicated in a block 408, the adapter generates and returns opaque Authorization Handle tokens as appropriate for each requested authorization element. The Authorization Handle is encoded in an implementation unique way to optimize authentication performance on the Read/Write commands. As indicated in a block 410, the adapter enforces the functions allowed on each command sent to a CAPI Server register space. At block 410, the Client sets the appropriate "Authorization Handle" in the Command; and the adapter uses the "Authorization Handle" to validate the command is allowed to be executed by the receiving CAPI Server register space.

Figure 5:
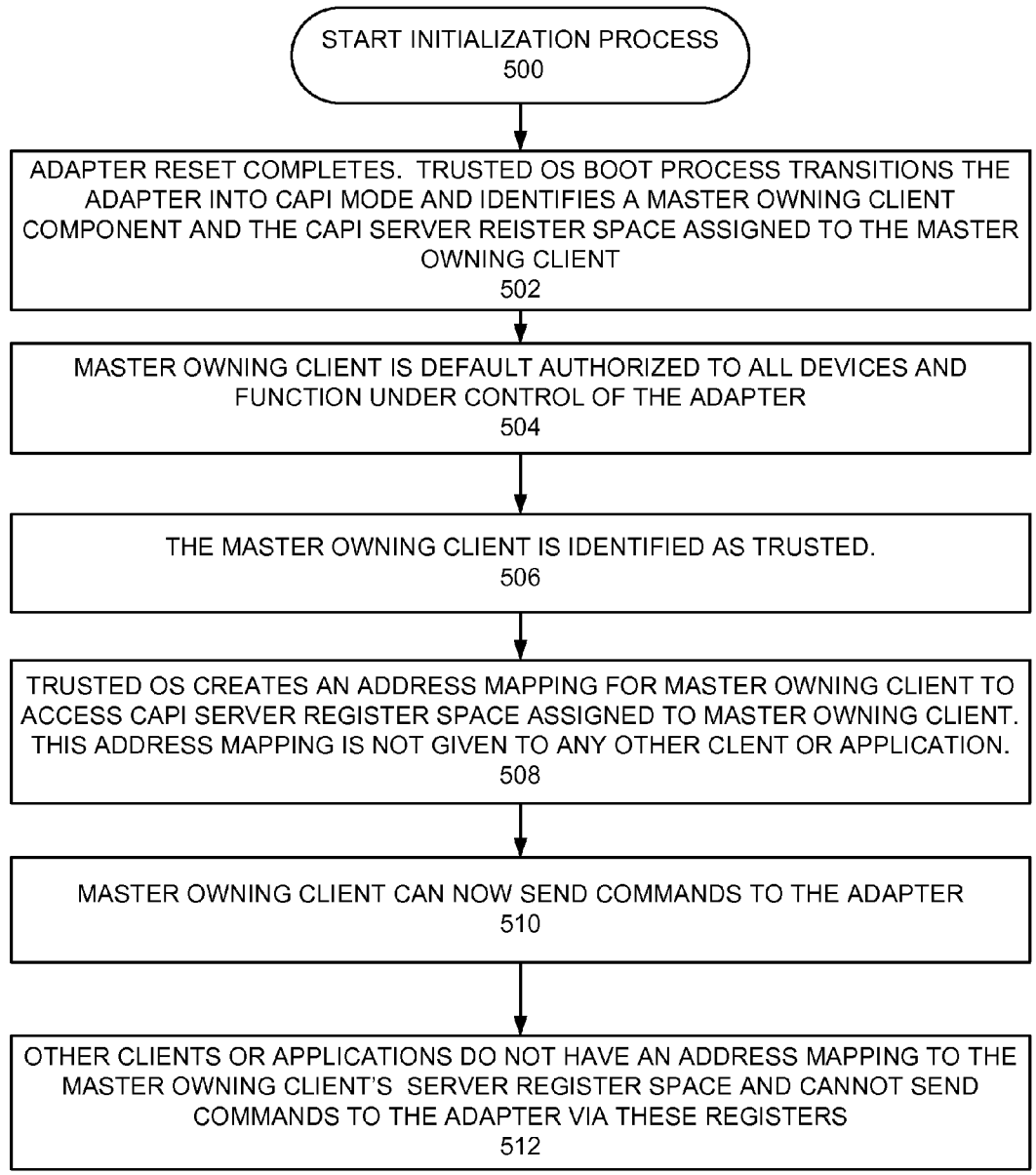
FIG. 5 illustrates example CAPI authorization initialization processing operations in accordance with the preferred embodiments.

Referring now to FIG. 5, there are shown example CAPI authorization initialization process operations in accordance with the preferred embodiments starting at a block 500. As indicated in a block 502 adapter reset completes, and the Trusted OS Boot process transitions the adapter into CAPI mode and identifies a Master Owning Client component and the adapter CAPI Server Register space assigned to the Master Owning Client. The Master Owning Client is default authorized to all Devices and functions under control of the adapter as indicated in a block 504. The Master Owning Client is identified as trusted as indicated in a block 506. As indicated in a block 508, the Trusted OS creates an address mapping for the Master Owning Client to access the CAPI Server Register space assigned to the Master Owning Client. This address mapping is not given to any other Client or Application.

The Master Owning Client can now send commands to the adapter as indicated in a block 510. As indicated in a block 512, other Clients or Applications do not have an address mapping to the Master Owning Client's Server register space and as such cannot send commands to the adapter via these registers.

Figure 6:
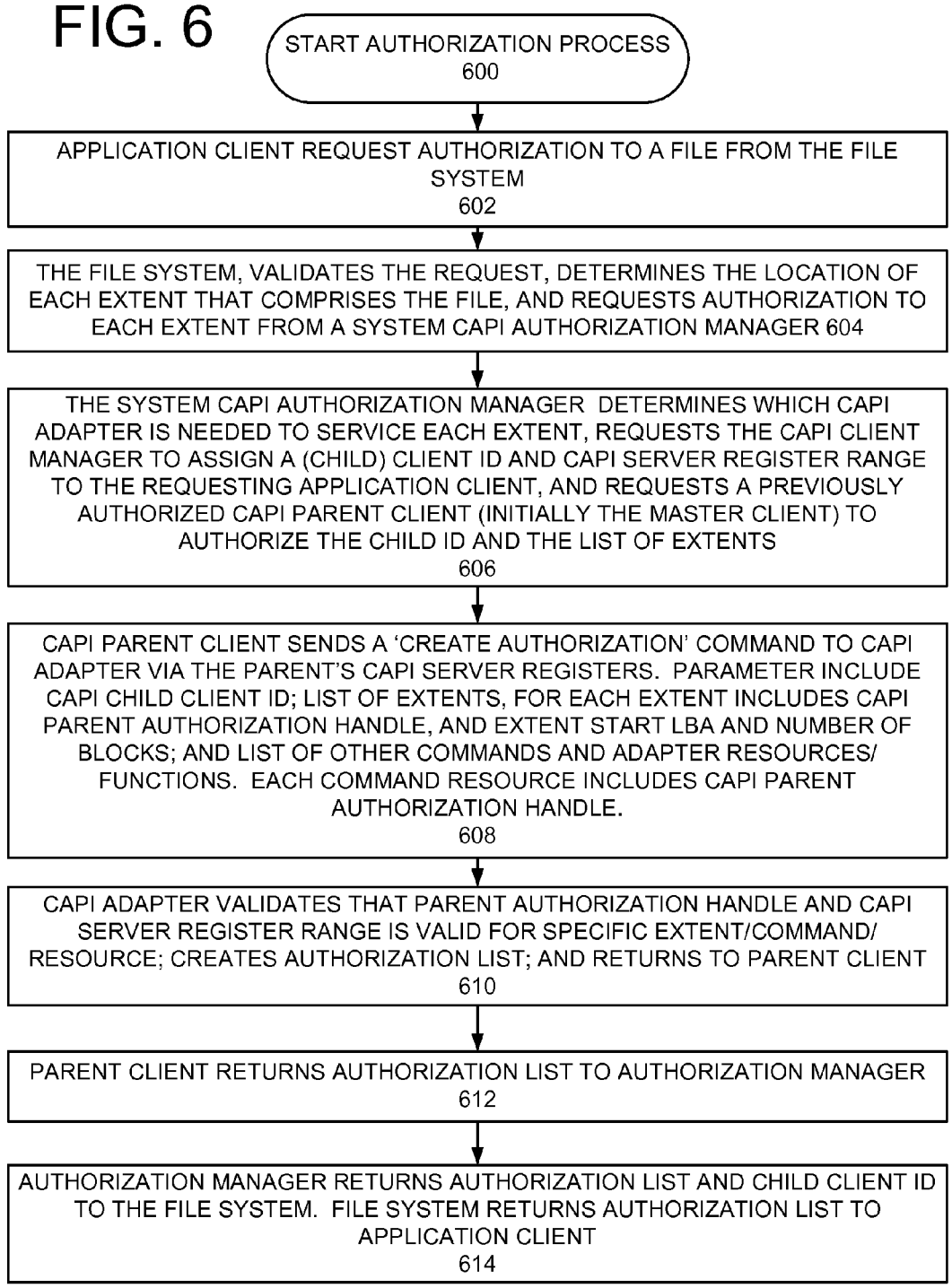
FIG. 6 illustrates example CAPI authorization processing operations in accordance with the preferred embodiments.

Referring now to FIG. 6, there are shown example CAPI authorization process operations in accordance with the preferred embodiments starting at a block 600. As indicated in a block 602, Application Client requests authorization to a file from the File system. The File system validates the request, determines the location of each Extent that comprises the file, requests Authorization to each Extent from a System CAPI Authorization manager as indicated in a block 604. The System CAPI Authorization manager determines which CAPI Adapter is needed to service each Extent, requests the CAPI Client manager to assign a (Child) Client ID and CAPI Server Register range to the requesting Application Client, and requests a previously authorized CAPI Parent Client (initially the Master Client) to authorize the Child ID to the list of Extents as indicated in a block 606. As indicated in a block 608, The CAPI Parent Client sends a "Create Authorizations" command to the CAPI Adapter via the Parent's CAPI Server Registers. Parameters are CAPI Child Client ID; List of Extents, for each Extent includes CAPI Parent Authorization Handle, and Extent Start LBA and number of Blocks; and List of other Commands/Adapter resources, for each command/resource includes CAPI Parent Authorization Handle. The CAPI Adapter validates that the Parent Authorization Handle and CAPI Server Register range is valid for the specific Extent/Command/Resource; creates an Authorization List by Assigning a new Child Authorization Handle for each requested, validated Extent/Command/Resource; and returns the Authorization List to the Parent Client as indicated in a block 610. The Parent Client returns the Authorization List to Authorization Manager as indicated in a block 612. The Authorization Manager returns the Authorization List and the Child Client ID to the File System and the File System returns the Authorization List and the Child Client ID to the Application Client as indicated in a block 614.

Figure 7:
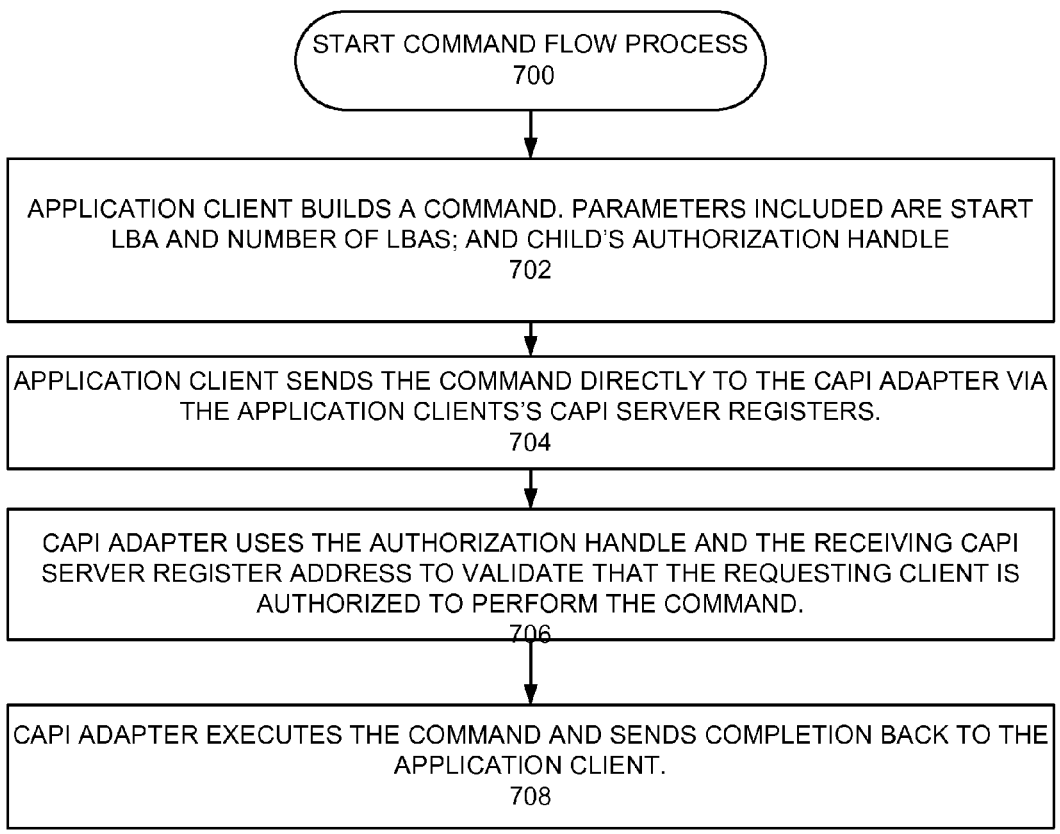
FIG. 7 illustrates example CAPI authorization command flow processing operations in accordance with the preferred embodiments.

Referring now to FIG. 7, there are shown example CAPI authorization command flow process operations in accordance with the preferred embodiments starting at a block 700. As indicated in a block 702, the application client builds a command. parameters included are start LBA and number of LBAs; and child's authorization handle. As indicated in a block 704, the application client sends the command directly to the CAPI adapter via the application clients's CAPI server registers. As indicated in a block 706, the capi adapter uses the authorization handle and the receiving CAPI server register address to validate that the requesting client is authorized to perform the command. As indicated in a block 708, the CAPI adapter executes the command and sends completion back to the application client.

Figure 8:
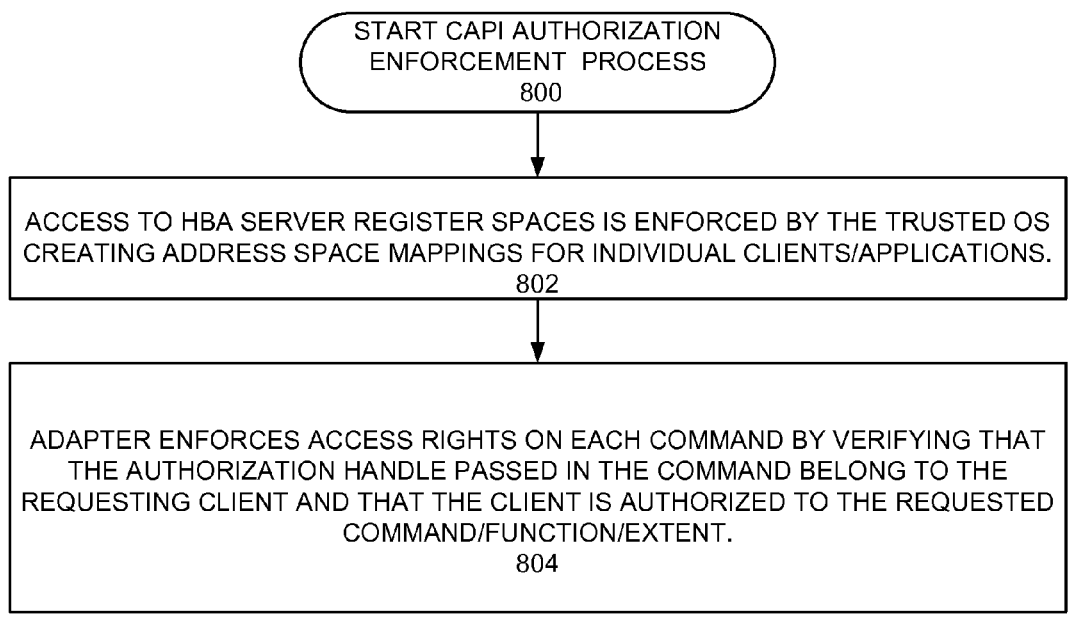
FIG. 8 illustrates example CAPI authorization enforcement processing operations in accordance with the preferred embodiments.

Referring now to FIG. 8, there are shown example CAPI authorization enforcement process operations in accordance with the preferred embodiments starting at a block 800. As indicated in a block 802, access to CAPI adapter server register spaces is enforced by the trusted OS creating address space mappings for individual clients/applications. As indicated in a block 804, the adapter enforces access rights on each command by verifying that the Authorization Handle passed in the command belong to the requesting Client and that the Client is authorized to the requested command/function/Extent.

Figure 9:
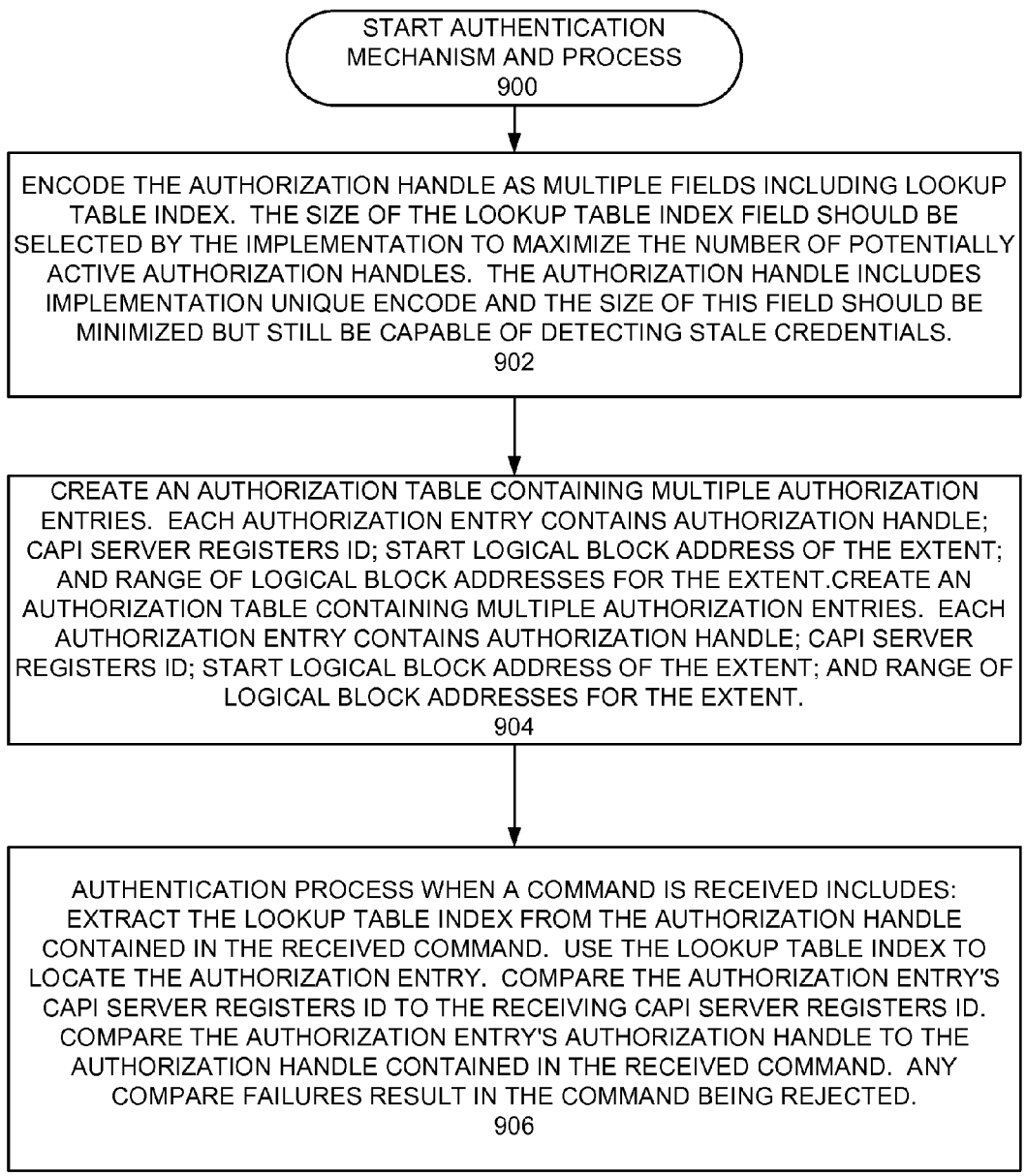
FIG. 9 illustrates example CAPI authorization mechanism and processing operations in accordance with the preferred embodiments.

Referring now to FIG. 9, there are shown example CAPI authorization mechanism and process operations in accordance with the preferred embodiments starting at a block 900. As indicated in a block 902, encode the Authorization Handle as multiple fields including Lookup Table Index. The size of the Lookup Table Index field should be selected by the implementation to maximize the number of potentially active Authorization Handles. The Authorization Handle includes Implementation Unique Encode and the size of this field should be minimized but still be capable of detecting stale Credentials. As indicated in a block 904, create an Authorization Table containing multiple Authorization Entries. Each Authorization Entry contains Authorization Handle; CAPI Server registers ID; Start Logical Block Address of the Extent; and Range of Logical Block Addresses for the Extent. As indicated in a block 906 the Authentication Process when a command is received includes: Extract the Lookup Table Index from the Authorization Handle contained in the received command. Use the Lookup table Index to locate the Authorization Entry. Compare the Authorization Entry's CAPI Server Registers ID to the Receiving CAPI Server Registers ID. Compare the Authorization Entry's Authorization handle to the Authorization Handle contained in the received command. Any Compare failures result in the command being rejected.

Figure 10:
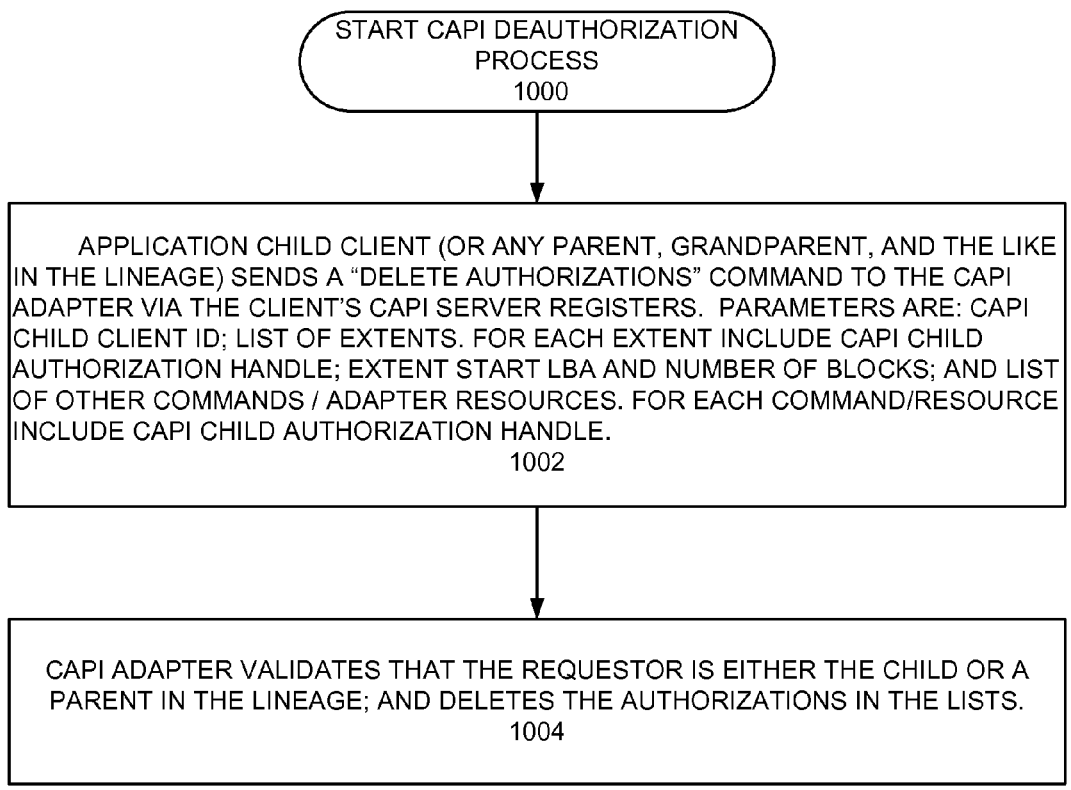
FIG. 10 illustrates example CAPI deauthorization processing operations in accordance with the preferred embodiments.

Referring now to FIG. 10, there are shown example CAPI deauthorization process operations in accordance with the preferred embodiments starting at a block 1000. As indicated in a block 1002, the Application Child Client (or any Parent, GrandParent, and the like in the lineage) sends a "Delete Authorizations" command to the CAPI Adapter via the Client's CAPI Server Registers. Parameters are: CAPI Child Client ID; List of Extents. For each Extent include CAPI Child Authorization Handle; Extent Start LBA and number of Blocks; and List of other Commands/Adapter resources. For each command/resource include CAPI Child Authorization Handle. As indicated in a block 1004, the CAPI Adapter validates that the Requester is either the Child or a Parent in the lineage; and deletes the Authorizations in the Lists.

Figure 11A:
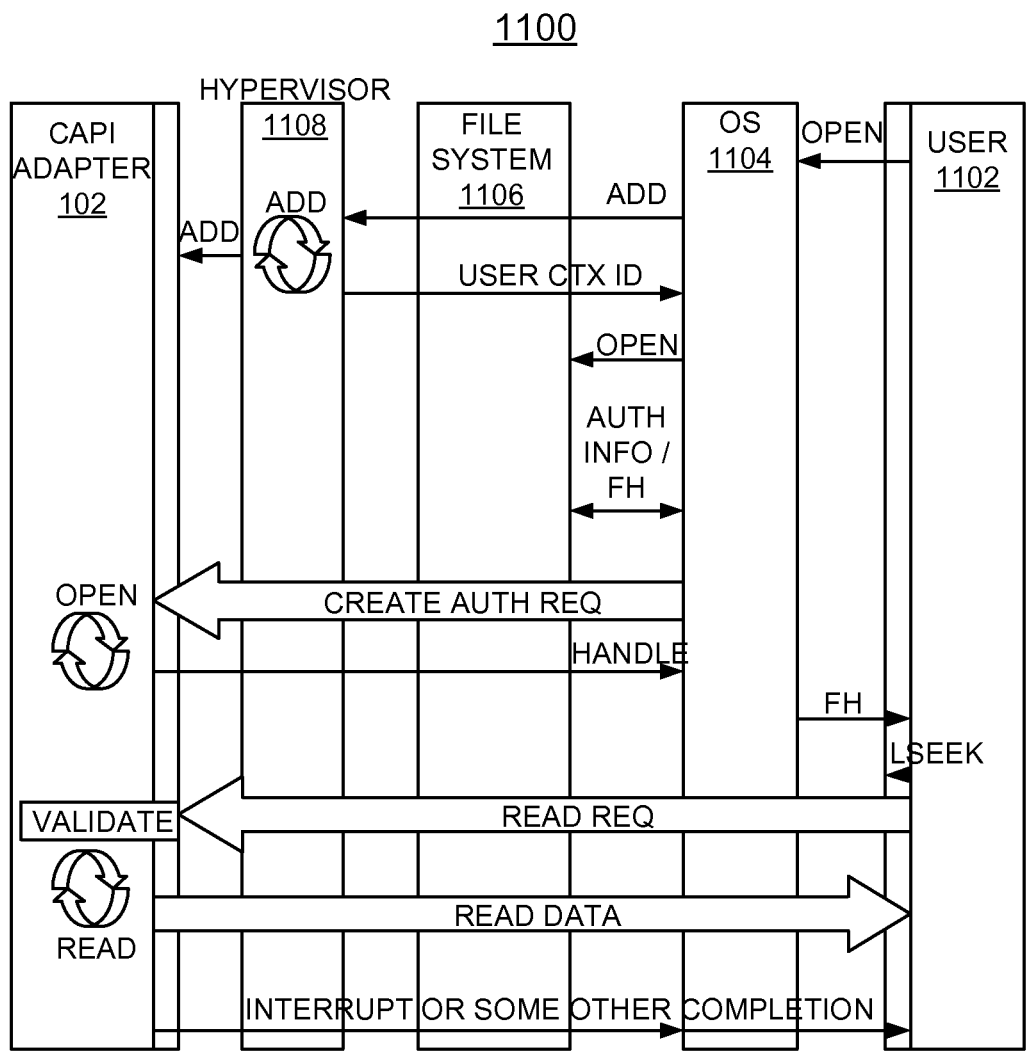
FIGS. 11A and 11B illustrate example CAPI authorization read command processing operations in accordance with the preferred embodiments.
Figure 11B:
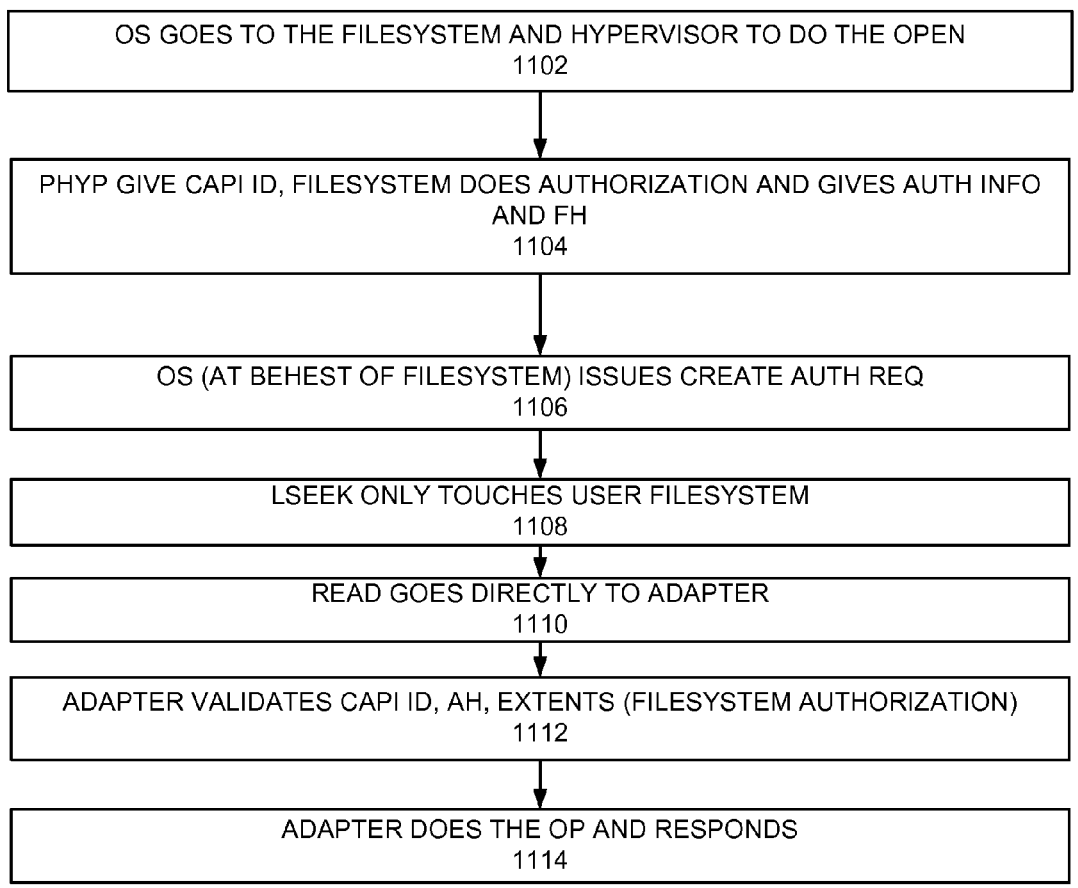

Referring now to FIGS. 11A and 11B, there are shown example CAPI authorization read command processing operations in accordance with the preferred embodiments. In FIG. 11A, example CAPI authorization operations for the read command are generally designated by the reference character 1100. Example CAPI authorization operations 1100 are shown with a user 1102, OS 1104, file system 1106, hypervisor 1108, and CAPI adapter 102. As indicated in a block 1102 in FIG. 11B, the OS goes to the filesystem and hypervisor to do the open. The hypervisor give CAPI ID, filesystem does authorization checks and returns authorization information and file handle (FH) as indicated in a block 1104. As indicated in a block 1106, OS (at behest of filesystem) issues a create authorization request. As indicated in a block 1108, Lseek only touches user filesystem. Read goes directly to CAPI Adapter as indicated in a block 1110. As indicated in a block 1112, CAPI adapter validates CAPI ID, authorization handle (AH), extents (filesystem authorization). Then the CAPI adapter does the operation (op), such as read request and responds with the read data as indicated in a block 1114.

Figure 12:
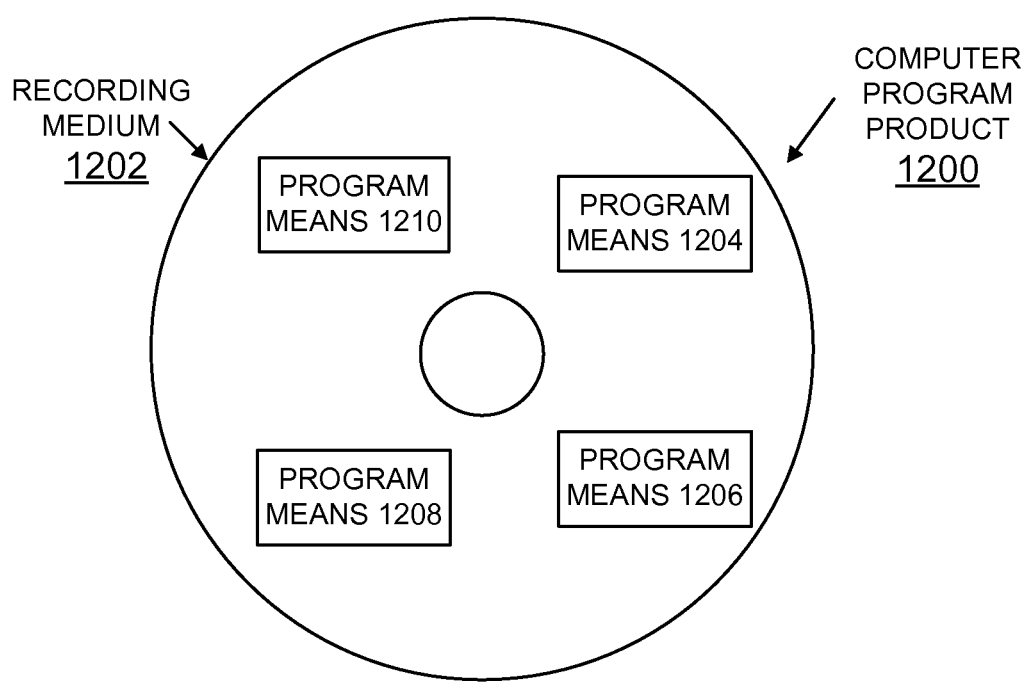
FIG. 12 is a block diagram illustrating a computer program product in accordance with the preferred embodiment.

Referring now to FIG. 12, an article of manufacture or a computer program product 1200 of the invention is illustrated. The computer program product 1200 is tangibly embodied on a non-transitory computer readable storage medium that includes a recording medium 1202, such as, a floppy disk, a high capacity read only memory in the form of an optically read compact disk or CD-ROM, a tape, or another similar computer program product. Recording medium 1202 stores program means 1204, 1206, 1208, and 1210 on the medium 1202 for carrying out the methods for implementing Coherent Accelerator Processor Interface (CAPI) authorization command flow processing in the CAPI adapter 102 of a preferred embodiment in the system 100 of FIGS. 1A, and 1B.

A sequence of program instructions or a logical assembly of one or more interrelated modules defined by the recorded program means 1204, 1206, 1208, and 1210, direct the computer system 100 for implementing block extent granularity authorization command flow processing in a CAPI adapter 102 of a preferred embodiment.

While the present invention has been described with reference to the details of the embodiments of the invention shown in the drawing, these details are not intended to limit the scope of the invention as claimed in the appended claims.

What is claimed is:

1. A method for implementing block extent granularity authorization command flow processing for a Coherent Accelerator Processor Interface (CAPI) adapter in a computer system comprising:

an Application Client, building a command including start Logical Block Address (LBA) and number of Logical Block Addresses (LBAs) and Child Authorization Handle, and sending the command directly to the CAPI Adapter via an Application Client CAPI Server Register assigned to the Application Client;

the CAPI Adapter validating the requesting Application Client authorized to perform the command using the command Authorization Handle and the receiving CAPI Server Register address; and the CAPI Adapter, responsive to validating the requesting Application Client authorized to perform the command, executing the command and sending completion directly to the Application Client.

2. The method as recited in claim 1, wherein the CAPI Adapter enforces access rights on each command by verifying that the Child Authorization Handle passed in the command belongs to the requesting Application Client and that the requesting Application Client is authorized to the requested command, function, and Extent.

3. The method as recited in claim 1, wherein the Child Authorization Handle defines client authorization for a subset of a block device or Logical Unit (LUN).

4. The method as recited in claim 1, includes the CAPI Adapter generating and storing an authorization table with multiple authorization entries, each authorization entry including an Authorization Handle with CAPI server registers identification (ID) including a start Logical Block Address of the extent and range of Logical Block Addresses for each extent.

5. The method as recited in claim 4, wherein the CAPI Adapter validating the requesting Client authorized to perform the command using the command Authorization Handle and the receiving CAPI Server Register address includes the CAPI Adapter comparing an Authorization Handle from an identified Authorization Entry in the authorization table and the Authorization Handle contained in the received command.

6. The method as recited in claim 5, includes the CAPI adapter extracting a Lookup Table Index from the Authorization Handle contained in the received command and using the Lookup table Index to identify the Authorization Entry.

7. The method as recited in claim 6, includes comparing CAPI server registers identification (ID) from an identified Authorization Entry in the authorization table and the receiving CAPI Server Register address for the received command.

8. The method as recited in claim 7, includes comparing CAPI Server Registers start Logical Block Address of the extent and range of Logical Block Addresses in the Authorization Entry to the start LBA and number of LBAs contained in the received command.

9. The method as recited in claim 8, includes responsive to a compare failure rejecting the received command for preventing unauthorized data access.

10. The method as recited in claim 1, includes providing a transport mechanism comprising a Coherent Accelerator Processor Interface (CAPI) and Peripheral Component Interconnect Express (PCIE).

\* \* \* \* \*